(12) United States Patent
Kaplan et al.

(10) Patent No.: US 9,746,992 B1
(45) Date of Patent: Aug. 29, 2017

(54) SYSTEMS AND METHODS FOR PROVIDING DYNAMIC PAGE INDICATORS

(71) Applicant: Google Inc., Mountain View, CA (US)

(72) Inventors: Joshua Robin Kaplan, San Francisco, CA (US); Michael Feldstein, San Francisco, CA (US); Leo Baghdassarian, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 617 days.

(21) Appl. No.: 14/267,553

(22) Filed: May 1, 2014

(51) Int. Cl.
*G06F 3/048* (2013.01)
*G06F 3/0481* (2013.01)
*G06F 3/0484* (2013.01)

(52) U.S. Cl.
CPC ...... *G06F 3/04817* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,741,268 B1* | 5/2004 | Hayakawa | G06F 3/0483 | 715/776 |
| 2004/0155907 A1* | 8/2004 | Yamaguchi | G06F 3/0481 | 715/810 |
| 2008/0062141 A1* | 3/2008 | Chandhri | G06F 3/0482 | 345/173 |
| 2012/0042279 A1* | 2/2012 | Naderi | G06F 3/04855 | 715/786 |
| 2012/0084692 A1* | 4/2012 | Bae | G06F 3/04817 | 715/769 |
| 2012/0162115 A1* | 6/2012 | Lim | G06F 15/0283 | 345/173 |
| 2012/0165076 A1* | 6/2012 | Yu | G06F 3/0481 | 455/566 |

* cited by examiner

*Primary Examiner* — Mahelet Shiberou
(74) *Attorney, Agent, or Firm* — Troutman Sanders LLP; James E. Schutz; Christopher C. Close, Jr.

(57) ABSTRACT

In an example implementation, a method includes outputting, for display at a display device, a first content item and a first group of content indicators being of a first quantity. The method also includes outputting, for display, a second group of content indicators being of a second quantity, such that the first and second groups are visually separated by at least one graphical element. The method includes, responsive to receiving an indication of a request to display a second content item, outputting, for display, an updated first group of content indicators of a third quantity that is one fewer than the first quantity and outputting, for display, an updated second group of content indicators of a fourth quantity that is one more than the second quantity. The method also includes outputting, for display at the display device, the second content item.

15 Claims, 10 Drawing Sheets

SYSTEMS AND METHODS FOR PROVIDING DYNAMIC PAGE INDICATORS

BACKGROUND

Computing devices may employ or implement pagination schemes that allow a user to transition between various pages of content available for display at a display area associated with the computing device. Generally, a pagination scheme includes a visual content indicator informing the user which content item from a plurality of content items is currently displayed. Existing pagination schemes and indicators, however, are often inadequate for conveying useful information to a user. For example, the indicators may be configured such that it is difficult for a user to distinguish between a first indicator identifying the currently displayed content item and the indicators representing content items that currently are not displayed. Further, such pagination schemes and indicators may provide an inadequate solution when used with mobile computing devices (e.g., smart phones or smart watches), which are often associated with small display areas. As a result, such content indicators may be too large for the display area of a given mobile computing device.

SUMMARY

Some or all of the above needs may be addressed by certain implementations of the disclosed technology. According to an example implementation, a method is provided. The method comprises outputting, by a computing device, and for display at a display device, a first content item and outputting, by the computing device, and for display at a first location of the display device, a first group of content indicators, the first group of content indicators being of a first quantity. The method further comprises outputting, by the computing device, and for display at a second location of the display device, a second group of content indicators, the second group of content indicators being of a second quantity, such that the first group of content indicators and the second group of content indicators are visually separated by at least one graphical element. Furthermore, the method comprises, responsive to receiving an indication of a request to display a second content item logically adjacent to the first content item outputting, by the computing device, and for display at the first location of the display device, an updated first group of content indicators, wherein the updated first group of content indicators is of a third quantity that is one fewer than the first quantity, and outputting, by the computing device, and for display at the second location of the display device, an updated second group of content indicators, wherein the updated second group of content indicators is of a fourth quantity that is one more than the second quantity. Finally, the method comprises outputting, by the computing device, and for display at the display device, the second content item.

According to another example implementation, a method is provided. The method comprises outputting, by a computing device, and for display at a display device, a first content item, wherein the first content item comprises a plurality of pages and outputting, by the computing device, and for display at a first location of the display device, a first group of content indicators, first group of content indicators being of a first quantity. The method further comprises outputting, by the computing device, and for display at a second location of the display device, a second group of content indicators, the second group of content indicators being of a second quantity, such that the first group of content indicators and the second group of content indicators are visually separated by at least one graphical element. In addition, the method comprises responsive to receiving an indication of a request to display a first page of the plurality of pages comprising the first content item causing, by the computing device, the first group of content indicators and the second group of content indicators to be removed from display on the computing device, and outputting, by the computing device, for display at the display device, the first page of the plurality of pages comprising the first content item. The method also comprises outputting, by the computing device, for display at a third location of the of the display device, a third group of content indicators, the third group of content indicators being of a third quantity, and outputting, by the computing device, and for display at a fourth location of the display device, a fourth group of content indicators, the fourth group of content indicators being of a fourth quantity, such that the third group of content indicators and the fourth group of content indicators are visually separated by at least one graphical element. Also, the method comprises responsive to receiving an indication of a request to display a second page of the plurality of pages comprising the first content item logically adjacent to the first page, and outputting, by the computing device, and for display at the third location of the display device, an updated third group of content indicators, wherein the updated third group of content indicators is of a fifth quantity that is one fewer than the third quantity. Furthermore, the method comprises outputting, by the computing device, and for display at the fourth location of the display device, an updated fourth group of content indicators, wherein the updated fourth group of content indicators is of a sixth quantity that is one more than the fourth quantity and outputting, by the computing device, and for display at the display device, the second page of the plurality of pages comprising the first content item.

According to another example implementation, a non-transitory computer-readable medium is provided. This non-transitory computer-readable medium comprises storing instructions that, when executed by one or more processors, cause a computing device to output, for display at a display device, a first content item, output, for display at a first location of the display device, a first group of content indicators, the first group of content indicators being of a first quantity, and output, for display at a second location of the display device, a second group of content indicators, the second group of content indicators being of a second quantity, such that the first group of content indicators and the second group of content indicators are visually separated by at least one graphical element. The non-transitory computer-readable medium further comprises storing instructions that, when executed by one or more processors, cause a computing device, responsive to receiving an indication of a request to display a second content item logically adjacent to the first content item, output, for display at the first location of the display device, an updated first group of content indicators, wherein the updated first group of content indicators is of a third quantity that is one fewer than the first quantity, output, for display at the second location of the display device, an updated second group of content indicators, wherein the updated second group of content indicators is of a fourth quantity that is one more than the first quantity, and output, for display at the display device, the second content item.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
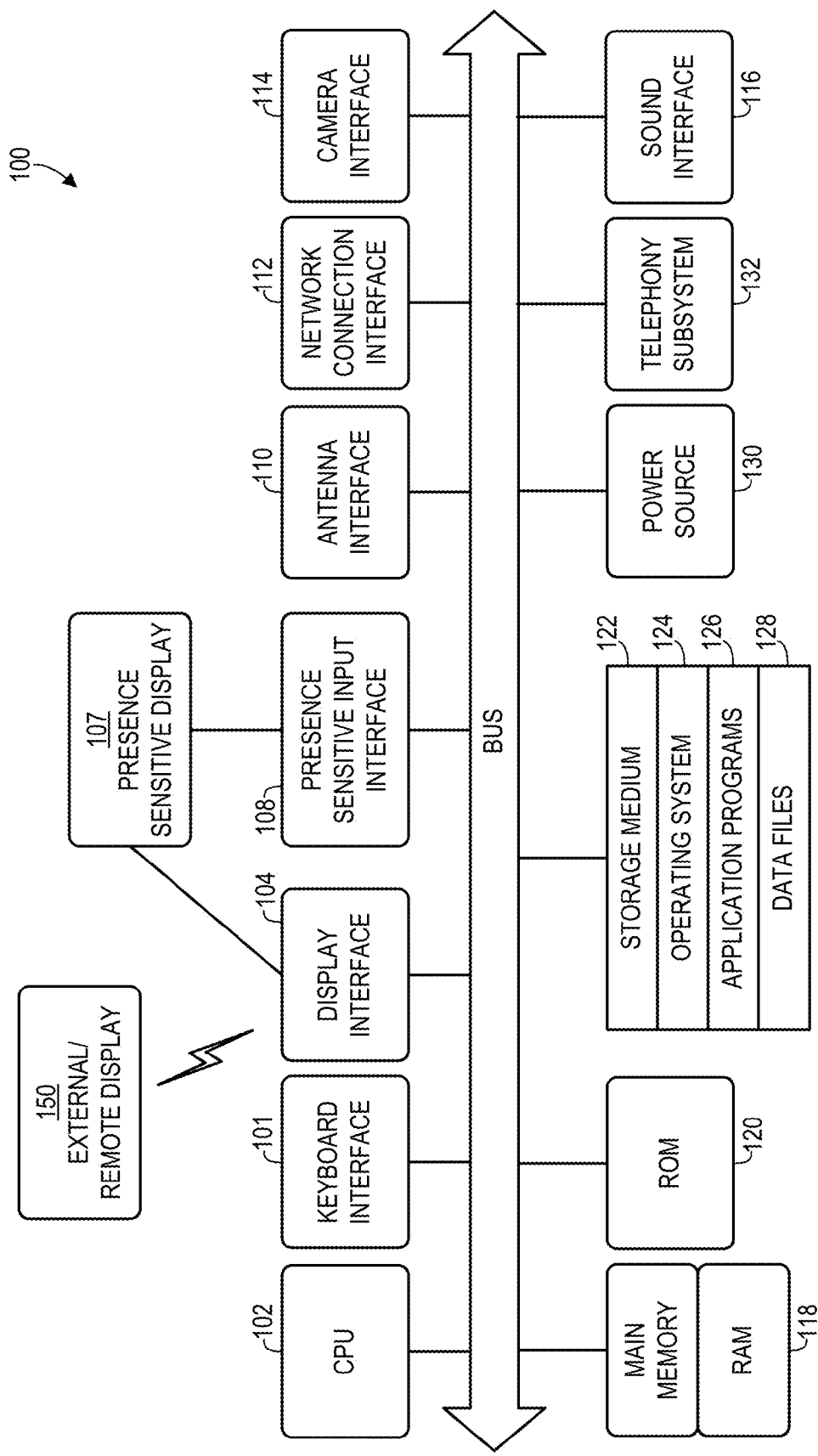
FIG. 1 is a block diagram of an illustrative computer system architecture 100, according to an example implementation.

In some implementations of the disclosed technology, a user interface output by a computing device may include an active content item currently output for display. In such implementations, additional, undisplayed content items (which are also available for viewing) may be organized to the right and left (or top and bottom) of the displayed content item within a visual flow or sequence of the user interface. To provide visual guidance to a user, separate groups of content indicators or page indicators associated with the displayed and undisplayed content items may be output within the user interface. For example, a first group of content indicators may be located on a right or left half of the currently displayed content item and may indicate the presence of undisplayed content items located to the right or left (respectively) of the active content item in the visual flow of the content items within the user interface. A second, separate group of content indicators may be located to the opposite side of the interface and may indicate the presence of undisplayed content items to the left of the active content item in the visual flow of content items. Responsive to the receipt of an input configured to cause the computing device to update the user interface, (e.g., a swipe or tap on a location of a presence-sensitive screen at which the currently displayed content item is displayed), the computing device may update the user interface to 1) display a content item adjacent to the currently displayed content item, and 2) transition a content indicator associated with the active content item from the group of indicators located on a right side of the currently displayed content item to the group of indicators located on the left side of the currently displayed content item, thereby indicating an change in the number of undisplayed content items available for viewing to either side of the now-displayed content item.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In example implementations, a computing device may be configured to output, for display (i.e., for presentation), a pagination scheme comprising multiple content indicators, each of which may correspond to a particular content item. In certain implementations, content items may include information that is relevant or useful to a user. Accordingly, in certain implementations, along with a content item, the computing device may be configured to output, for display, a certain quantity of content indicators at a predetermined location. In example implementations, one of the content indicators may be associated with the currently displayed content item, and the others may be associated with non-displayed content items. Further, in some implementations, the computing device may be configured to display a second group of content indicators in a location separate from the first group.

In example implementations, content items may be configured logically consecutively or adjacently such that the computing device may output the content items consecutively in the visual flow of content items. Accordingly, upon receipt of an indication of inputs gestures (such as a swipe gesture at a presence-sensitive display associated with the computing device), a computing device may be configured to output, for display, logically consecutive (i.e., adjacent) content items, thereby enabling a user to navigate between content items.

In certain implementations, upon receipt of an indication to display an adjacent content item, the computing device may be configured to output an updated first group and second group of content items or page indicators. For example, the updated first group may comprise a quantity that is one fewer than was previously displayed. Further, the second group may comprise a quantity that is one more than was previously displayed. In certain implementations, the computing device may be configured to then output for display the adjacent content item.

As discussed, in example implementations, a content indicator included in the first group may be associated with the presently displayed content item. In certain implementations, upon receipt of an input gesture to display an adjacent content item, the content indicator associated with the presently displayed content item will not correspond to the adjacent content item. Accordingly, before outputting the adjacent content item, the computing device may be configured to output, for display, and updated first and second group of content indicators such that the content indicator associated with the presently displayed content item is included in the updated second group and is no longer included in the updated first group.

Therefore, in example implementations, in response to, for example, a swipe gesture moving from the top to the bottom of the presence-sensitive display, the computing device may transition from displaying a first content item to displaying an adjacent, second content item. Further, the computing device may be configured such that prior to outputting the second content item for display, it outputs an animation in which the first content item "slides" down "through" the bottom of the display area such that when the computing device outputs the second content item for display, the second content appears to slide into the display area "through" the top of the display area.

Likewise, in example implementations, the computing device may be configured to output an animation in which the content indicator in the first group that is associated with the first content item "slides" down the left side of the display area and stops in the bottom left corner (i.e., is "added to" the second group of content indicators) as the first content item "slides" down "through" the bottom of the display area. In example implementations, the computing device may be configured to output, for display, a transition content indicator that achieves the same effect. For example, the computing device may be configured to output, for display, the transition content indicator at a third location that is located between the first and second groups of content indicators. In example implementations, as the computing device receives input to transition through the plurality of content items, the computing device may be configured to output corresponding content indicators or transition content indicators such that the content indicators appear to slide down the display area.

As will be understood, content items may comprise or be associated with more information than can be displayed on a display area (i.e., a content item may span multiple pages). Accordingly, in example implementations, a separate pagination scheme may be associated with the plurality of pages comprising a particular content item. In example implementations, a user may provide an input gesture (e.g., tap gesture) to access a particular content item of interest and the pages comprising that content item (i.e., the information associated with the content item). In example implementations, upon receipt of the indication of an input gesture (e.g., a tap gesture), the computing device may be configured to output, for display, a pagination scheme comprising content indicators associated with or appearing to correspond to the pages comprising the selected content item. Further, the computing device may be configured to remove from presentation (i.e., remove from display) the pagination scheme associated with the plurality of content items.

In example implementations, the computing device may be configured to output, for display, content indicators associated with the pages comprising the selected content item such that the content indicators are grouped in a horizontal linear arrangement displayed at the bottom right corner of the display area associated with the computing device. As above, a user may navigate between the pages of the content item by providing an input gesture such as a swipe gesture at a presence-sensitive display. Therefore, in example implementations, to transition from a first page to a second page, the user may input a swipe gesture moving from the right to the left of the presence-sensitive display. Upon receipt of the indication of the swipe gesture, the computing device may be configured to output, for display, the second page.

Further, in example implementations, the computing device may be configured such that prior to outputting the second page for display, it outputs an animation in which the first page "slides" out of the display area "through" the left side of the display area. Accordingly, when the computing device outputs, for display, the second page, it outputs an animation in which the second page "slides" into the display area "through" the right side of the display area. Likewise, the computing device may be configured such that the content indicator associated with the first page (i.e., the first abacus bead) appears to "slide" across the bottom of the display area and stop in the bottom left corner as the first page is depicted sliding through the left side of the display area. In response to an input gesture (such as a swipe gesture), the computing device may transition from displaying a first page of a selected content to a second page, and the computing device may output an animation in which content indicators corresponding to the transitioned pages "slide" across the bottom of the display area.

In example implementations, pages comprising a content item may include actionable content. Actionable content may comprise content with which the user can interact and which may allow the user to access additional functionalities or applications of the computing device. For example, content indicators associated with pages including actionable content may comprise graphical icons representing the actionable content. In example implementations, a page may include a phone number (i.e., actionable item) relating to the content item, and the user can input a gesture (i.e., touch-and-hold gesture) at the presence-sensitive device to initiate a telephone call to the number associated with the content item. In the foregoing example, the content indicator associated with the page comprising the phone number (i.e., the actionable content) may be displayed as a graphical icon of a telephone receiver. As will be appreciated, pagination indicators displayed as graphical icons may serve to alert a user both that a content item comprises actionable content and what type of actionable content the content item comprises.

As will be further appreciated, a pagination scheme similar to the disclosed pagination scheme may provide the user with a simple visual reference of how many content items or an estimate of how many content items are available to the user at a given time. Further, a pagination scheme similar to the disclosed pagination scheme may allow the user to determine at a glance the general placement of the currently viewed content item relative to the available content items. For example, a user can glance at the pagination scheme to determine whether there are additional content items available for viewing or how many items are available for viewing relative to how many items have already been viewed.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2A:
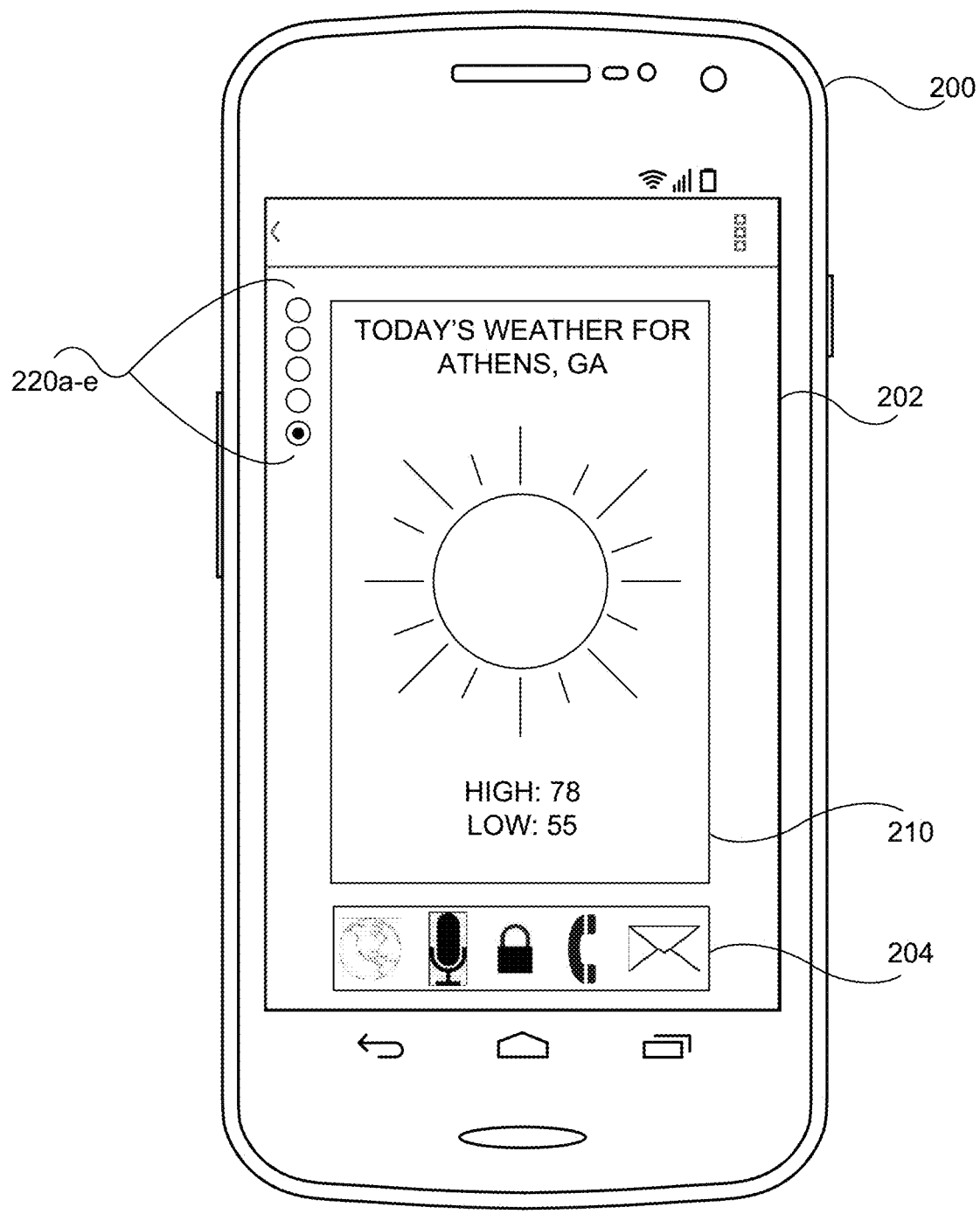
FIG. 2A illustrates a mobile computing device 200 displaying a first content item 210 and a pagination scheme comprising a plurality of content indicators, according to an example implementation.

FIG. 2A illustrates a mobile computing device 200 according to an example implementation of the disclosed technology, which may include some or all of the components of the computing device 100 shown in FIG. 1. The mobile computing device 200 comprises a presence-sensitive display 202. The presence-sensitive display 202 may be configured to display visual content and to function as an input device at which users may input gestures, which may be input by an input object such as a stylus or finger, and which the computing device 200 may be configured to receive as indications of input gestures. In one implementation, an indication of an input gesture may be indicative of or associated with an input or an input gesture. As will be understood, an indication of a gesture may be associated with a user's intention to unlock or log on to a mobile computing device 200. Further, a user's input gesture may indicate the user's intention to select an input element (e.g., the input elements represented by graphical icons in the input element dock 204, as shown in FIG. 2A), which may be associated with an application that may be executed on the mobile computing device 200.

FIG. 2A further illustrates a content item 210, which is displayed on the presence-sensitive device 202 of the mobile computing device 200. In one implementation, a content item 210 may include information that is relevant or useful to a user. For example, in one implementation, a computing device (e.g., mobile computing device 200) may be configured to identify actions repeatedly performed by a user and, in response, autonomously generate and output, for display, one or more content items (e.g., content item 210) comprising information relating to the user's repeated actions. Therefore, for example, upon determining that a user repeatedly utilizes the mobile computing device 200 to seek the weather forecast for Athens, Ga., the mobile computing device 200 may be configured to autonomously generate and output for display a content item 210 comprising the daily weather forecast for Athens, Ga., as shown in FIG. 2A. As will be understood, a content item (e.g., content item 210) may comprise various forms of information that may be helpful to a user. For example, a content item may comprise an email or text message for the user as received by mobile computing device 200, or a content item may be generated based on information contained in a user's email or text messages. Further, a content item may comprise an article or other information from an internet website or other online information source.

In example implementations, a computing device (e.g., mobile computing device 200) may be configured to generate and output for display a plurality of content items. Accordingly, in one implementation, a computing device may be configured to employ and output for display a pagination scheme that may assist users in navigating between the multiple content items. FIG. 2A shows a pagination scheme according to an example implementation that comprises a plurality of content indicators 220a-e (i.e., a group of content indicators or page indicators), which have been output for display at a first location. In example implementations, each content indicator corresponds or appears to correspond to a content item. Further, in example implementations, the content indicator 220a that corresponds to the currently displayed content item (i.e., content item 210) may be differentiated from the remaining content indicators. As shown in FIG. 2A, the content indicator 220a that corresponds to content item 210 comprises two concentric circles with the interior circle being completely filled. As will be understood and appreciated, many options exist for differentiating the content indicator corresponding to the currently displayed content item. For example, a content indicator could be differentiated by appearing as a different shape or size from the remaining indicators, or it could be differentiated by being a different color from the other indicators. Various other differentiating options will occur to one of skill in the art.

Further, in example implementations, a computing device (e.g., mobile computing device 200) may be configured to generate and output, for display, a second group of content indicators that further comprises the pagination scheme. For example, the mobile computing device 200 may be configured to output, for display, a second group of content indicators at a second location with at least one graphical element separating the first and second groups. In one implementation, the graphical element may be configured such that it appears identical to the background of the presence-sensitive display 202. In an alternate implementation, the graphical element may be configured to appear similar to a wire or string connecting the first and second groups of content indicators.

Figure 2B:
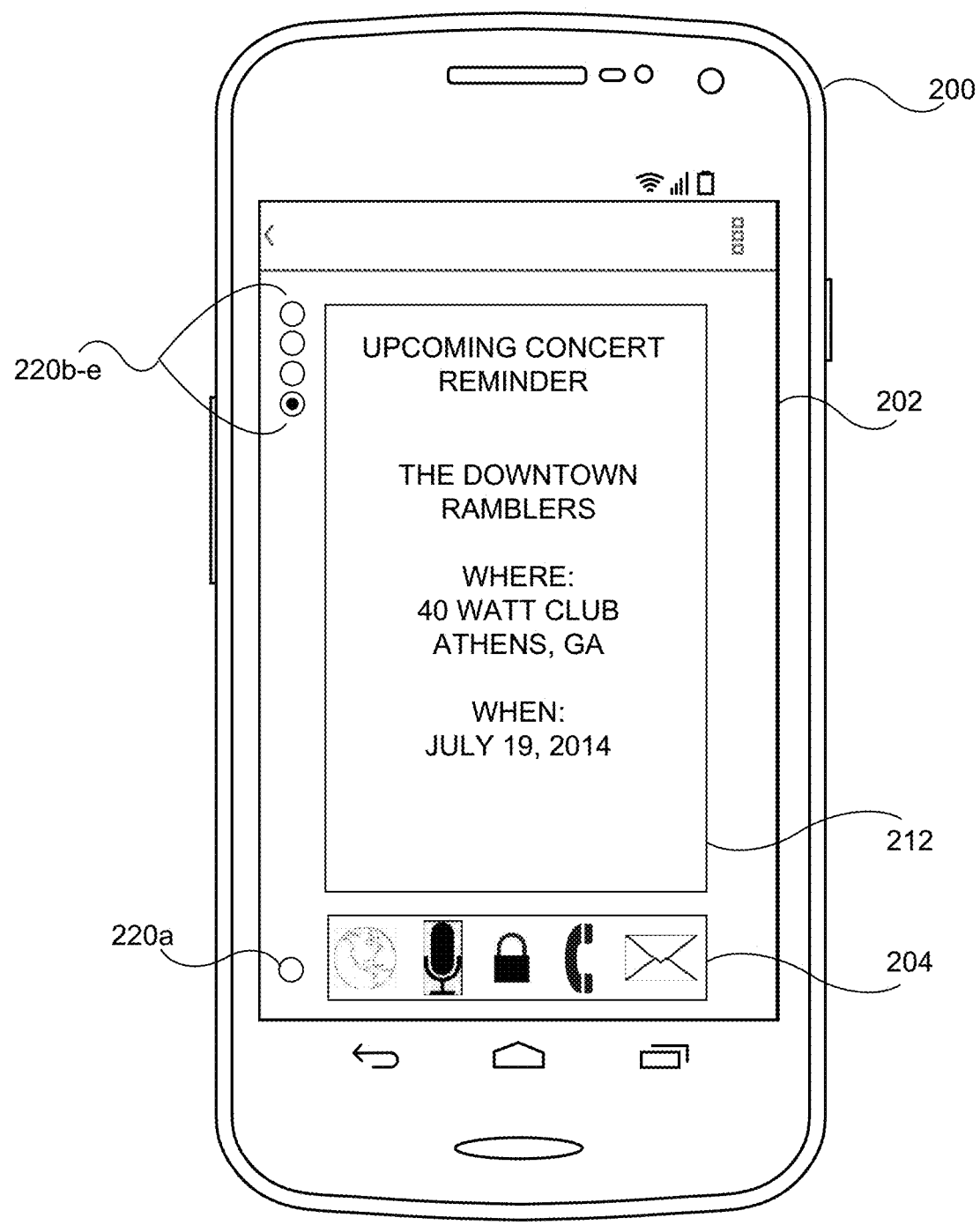
FIG. 2B illustrates a mobile computing device 200 displaying a second content item 212 and a pagination scheme comprising a plurality of content indicators, according to an example implementation.

In example implementations, the computing device may enable a user to navigate between content items by receiving indications of input gestures (such as a swipe gesture at a presence-sensitive display 202). Accordingly, in one example, in response to a swipe gesture moving, for example, from the top to the bottom of the presence-sensitive display 202, the computing device 200 may transition from displaying the original content item 210 to displaying a new content item 212, as shown in FIG. 2B. In one implementation, the mobile computing device 200 may be configured such that prior to outputting, for display, the new content item 212, it outputs an animation in which the original content item 210 "slides" down "through" the bottom of the presence-sensitive display 202. Accordingly, the mobile computing device 200 may be configured such that prior to outputting, for display, the new content item 212, it outputs an animation in which the new content item 212 "slides" into the presence-sensitive display 202 "through" the top of the presence-sensitive display 202.

Likewise, in example implementations, the mobile computing device 200 may be configured such that content indicator 220a, which corresponds to first content item 210, appears to "slide" down the left side of the presence-sensitive display 202 and stop in the bottom left corner as the first content item 210 appears to "slide" down "through" the bottom of the presence-sensitive display 202. Accordingly, in example implementations, the mobile computing device 200 may be configured to output, for display, content indicator 220b, which is associated with currently displayed content item 212 such that it appears different from the remaining indicators (i.e., 220a and 220c-e). As will be appreciated, in one implementation, as the mobile computing device 200 outputs for display animations in which the plurality of content items "slide" down "through" the bottom of the presence-sensitive display 202, the mobile computing device 200 may also output for display animations in which the content indicators corresponding to those content items "slide" down the presence-sensitive display 202 in a manner evocative of abacus beads.

Put differently, in example implementations, upon receipt of the indication of the swipe gesture, in addition to outputting for display the new content item 212, the mobile computing device 200 may be configured to output, for display, an updated first group of content indicators (i.e., 220b-e) such that the updated first group of content indicators is of a quantity that is one fewer than before receipt of the indication of the swipe gesture. Further, in one implementation, upon receipt of the indication of the swipe gesture, the mobile computing device 200 may be configured to output, for display, an updated second group of content indicators (i.e., 220a) such that the updated second group of content indicator is of a quantity that is one more than before the receipt of the indication of the swipe gesture.

As will be appreciated further, a pagination scheme similar to the disclosed pagination scheme may provide the user with a simple visual reference or estimate of how many content items are available to the user at a given time. Further, a pagination scheme similar to the disclosed pagination scheme may allow the user to determine at a glance the general placement of the currently viewed content item relative to the available content items. For example, as shown in FIG. 2B, a user can glance at the pagination scheme and see the currently displayed content item is represented by content indicator 220b (i.e., the currently display content item is the second of five available content items). Accordingly, the user can recognize that there are three additional content items available for viewing or, alternatively, that there are more content items to be viewed than have already been viewed.

Figure 2C:
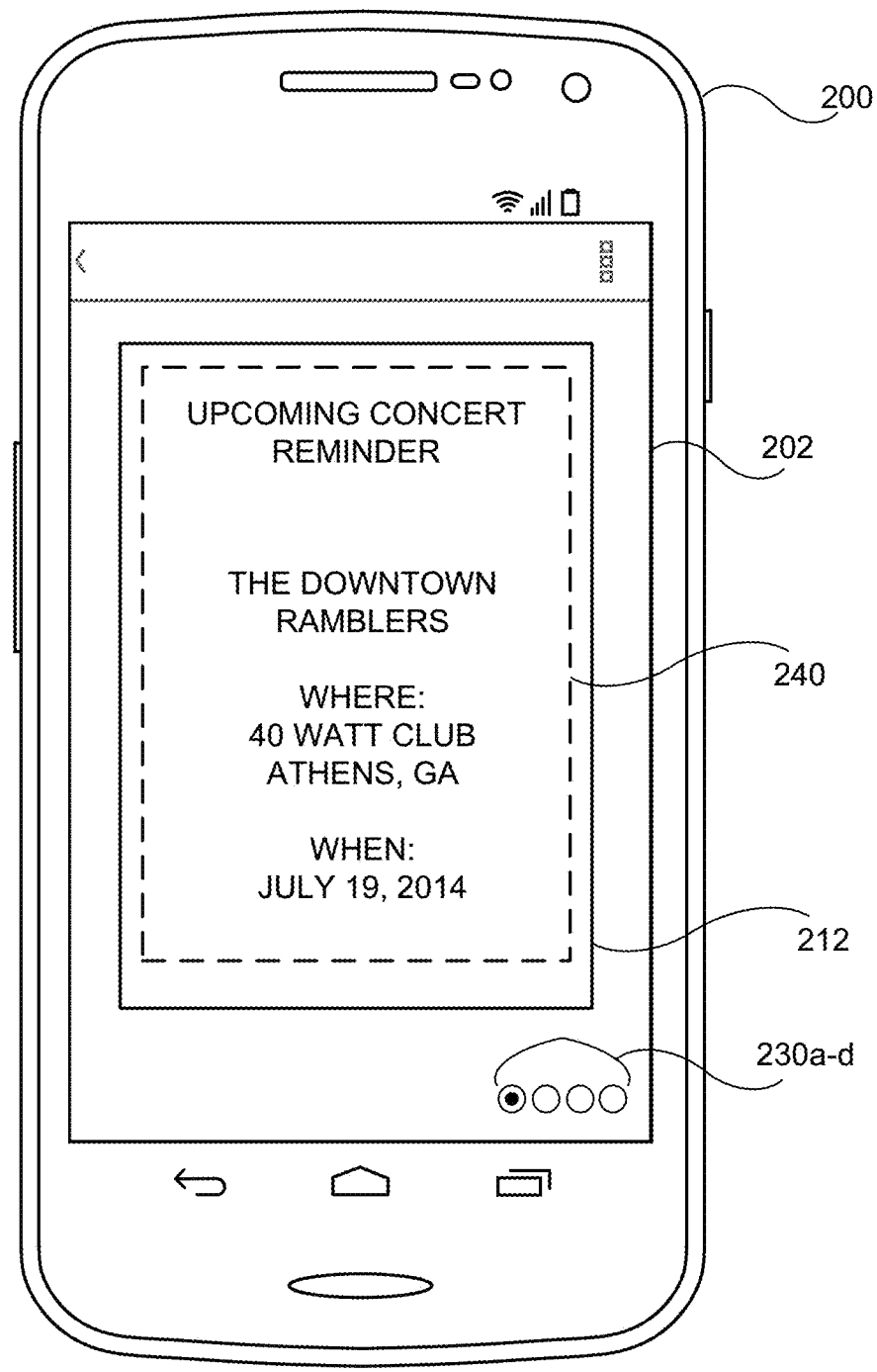
FIG. 2C illustrates a mobile computing device 200 displaying the first page 240 of the second content item 212 and an alternate pagination scheme comprising a plurality of content indicators after receiving indication of an input gesture from a user, according to an example implementation.

In one implementation, content items (e.g., content item 212) may comprise or be associated with additional information that can be displayed on a display area. Put differently, content items may comprise information that may span multiple pages. Accordingly, in one implementation, in response to an input gesture (such as a tap gesture), the mobile computing device 200 may provide access the content item 212 and additional information (i.e., pages) associated with the content item 212. As shown in FIG. 2C, upon receipt of the indication of the tap gesture, the mobile computing device 200 may be configured to output, for display, an alternate pagination scheme comprising content indicators 230a-d. Similar to what was shown in FIGS. 2A and 2B, in one implementation, the mobile computing device 230 is configured to cause the content indicator 230a associated with the currently displayed page 240 of the currently selected content item 212 to appear different from the remaining content indicators (i.e., 230b-d). Further, in one implementation, in addition to outputting, for display, an alternate pagination scheme comprising content indicators 230a-d, a mobile computing device 200 may be configured to remove from presentation (i.e., remove from display) the input element dock 204.

Figure 2D:
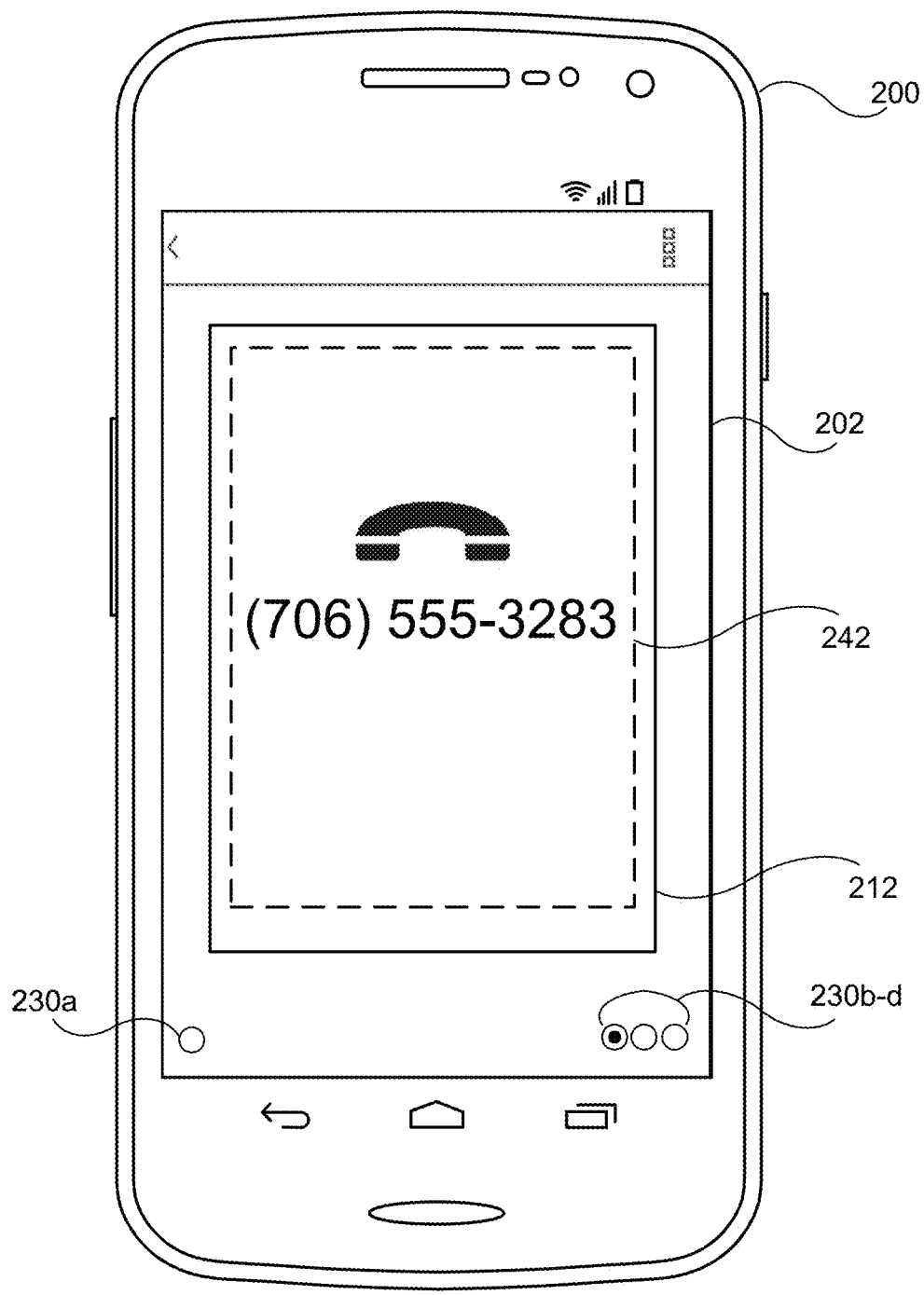
FIG. 2D illustrates a mobile computing device 200 displaying the second page 242 of the second content item 212 and an alternate pagination scheme comprising a plurality of content indicators after receiving indication of an input gesture from a user, according to an example implementation.

In the foregoing example, a user has indicated interest in an upcoming concert (e.g., the user has utilized the mobile computing device's 200 internet browser to search for information relating to the concert). In response to the user's search, the mobile computing device 200 has autonomously generated and output, for display, content item 212 comprising information relating to the concert, which, in the present example, spans multiple pages. In one implementation, the user can navigate between the pages of the content item 212 by inputting a swipe gesture. Therefore, in the foregoing example, to transition from the first page 240 of the content item 212 to an unshown second page, the user may input a swipe gesture moving from the right to the left of the presence-sensitive display 202. In one implementation, upon receipt of the indication of the swipe gesture, the mobile computing device 200 may be configured to output, for display, the second page 242 of the content item 212, as shown in FIG. 2D.

Further, in one implementation, the mobile computing device 200 may be configured such that prior to outputting for display the second page 242 of the content item 212, it outputs an animation in which the first page 240 "slides through" the left side of the presence-sensitive display 202 such that when the mobile computing device 200 outputs the second page 242 for display, the second page 242 "slides" into the presence-sensitive display 202 "through" the right side of the presence-sensitive display 202. Additionally, in one implementation, the mobile computing device 200 may be configured such that the content indicator 230a associated with the first page 240 "slides" across the bottom of the presence-sensitive display 202 and stops in the bottom left corner as the first page 240 "slides through" the left side of the presence-sensitive display 202. Additionally, the mobile computing device 200 may be configured to cause the content indicator 230b associated with the currently displayed second page 242 to appear as different from the remaining indicators (i.e., 230a and 230c-d), as shown in FIG. 2D.

As noted previously, in some implementations, the content item 212 may comprise actionable content. Actionable content may comprise content with which the user can interact and that may allow the user to access additional functionalities or applications provided by or associated with the mobile computing device 200. Therefore, while the first page 240 of the content item 212 may comprise high-level information relating to the concert (e.g., date, location), additional pages may comprise actionable or interactive content relating to the concert. For example, as shown in FIG. 2D, the second page 242 of the content item 212 may comprise a graphical icon of a telephone and a telephone number for the venue hosting the concert. Accordingly, upon receipt of an indication of a touch gesture (e.g., touch-and-hold gesture) at the presence-sensitive display 202, the mobile computing device 200 may be configured to initiate a telephone call to the concert venue.

Figure 2E:
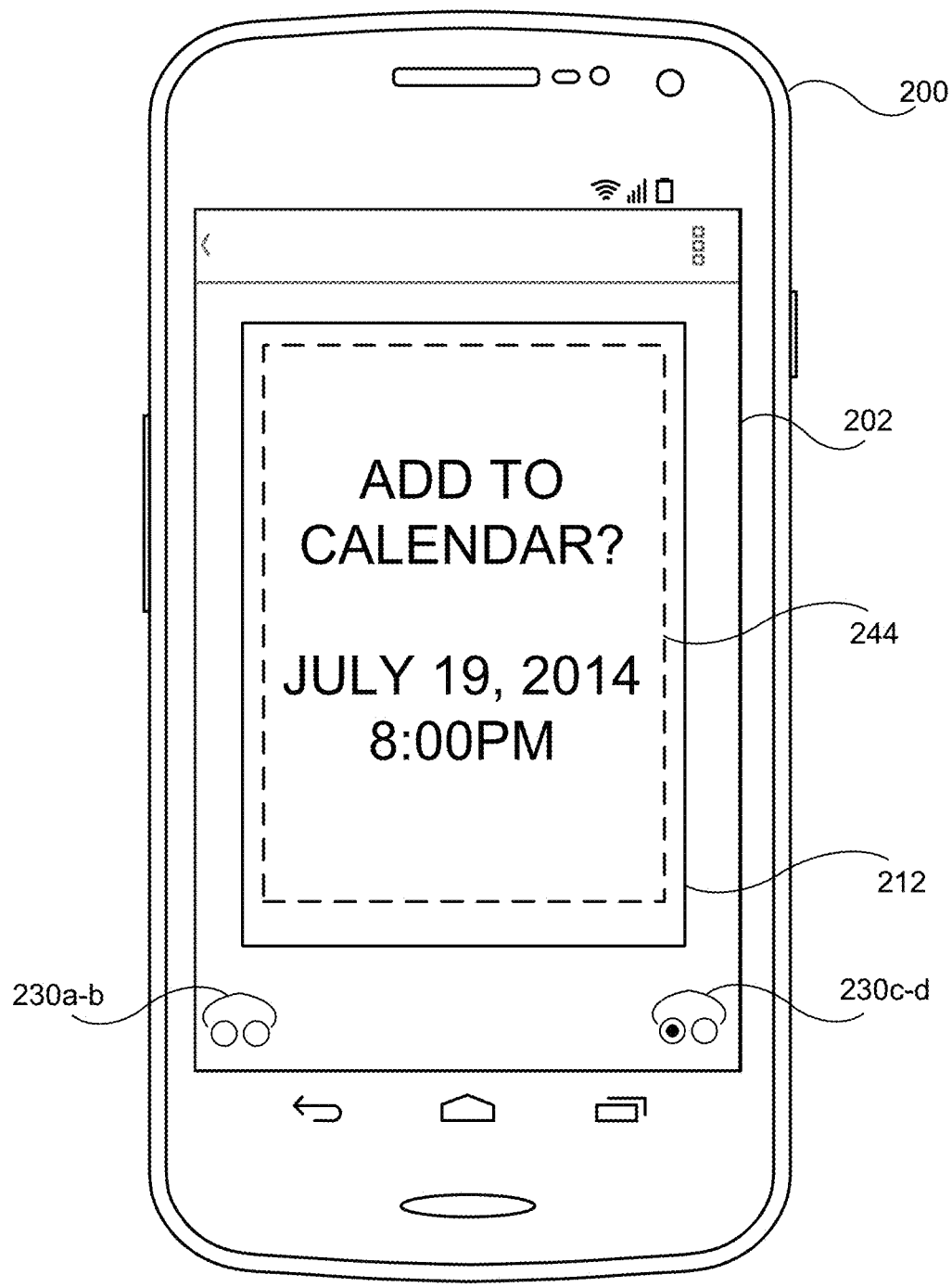
FIG. 2E illustrates a mobile computing device 200 displaying the third page 244 of the second content item 212 and an alternate pagination scheme comprising a plurality of content indicators after receiving indication of an input gesture from a user, according to an example implementation.

In one implementation, actionable content may comprise an option to add an event to a calendar associated with the mobile computing device 200. As shown in FIG. 2E, the third page 244 of the content item 212 comprises the date and time of the concert along with a question asking if the user would like to add the information to an associated calendar. In one implementation, upon receipt of an input gesture (e.g., touch-and-hold gesture) at the presence sensitive display 202, the mobile computing device 200 may be configured to cause a calendar application associated with the mobile computing device 200 to generate and calendar a reminder relating to the concert.

As shown in FIG. 2E, the mobile computing device 200 has output, for display, the third page 244 of the content item 212 upon receipt of the indication of the swipe gesture from the user. In example implementations, the mobile computing device 200 may be configured to output an animation such that the content indicator 230b associated with the second page 242 of the content item 212 "slides" across the bottom of the presence-sensitive display 202. According to one implementation and as shown in FIG. 2E, the mobile computing device 200 may be configured to output, for display, content indicator 230b associated with the second page 242 of the content item 212 such that it appears in the bottom left corner of the presence-sensitive display 202 alongside the content indicator 230a associated with the first page 240 of the content item 212. In one implementation, the mobile computing device 200 may be configured to output, for display, content indicators 230c and 230d as a first group of content indicators and content indicators 230a and 230b as a second group of content indicators.

In example implementations, actionable content may comprise an option for a user to access a music library associated with the mobile computing device 200 to listen to music by the band associated with content item 212 (i.e., The Downtown Ramblers). As shown in FIG. 2E, the fourth page 246 of the content item 212 provides the user with such an option. In one implementation, upon receipt of an indication of an input gesture (e.g., touch-and-hold gesture) at the presence sensitive display 202, the mobile computing device 200 may be configured to initiate an application to allow the user to listen to music by the band associated with content item 212.

Figure 2F:
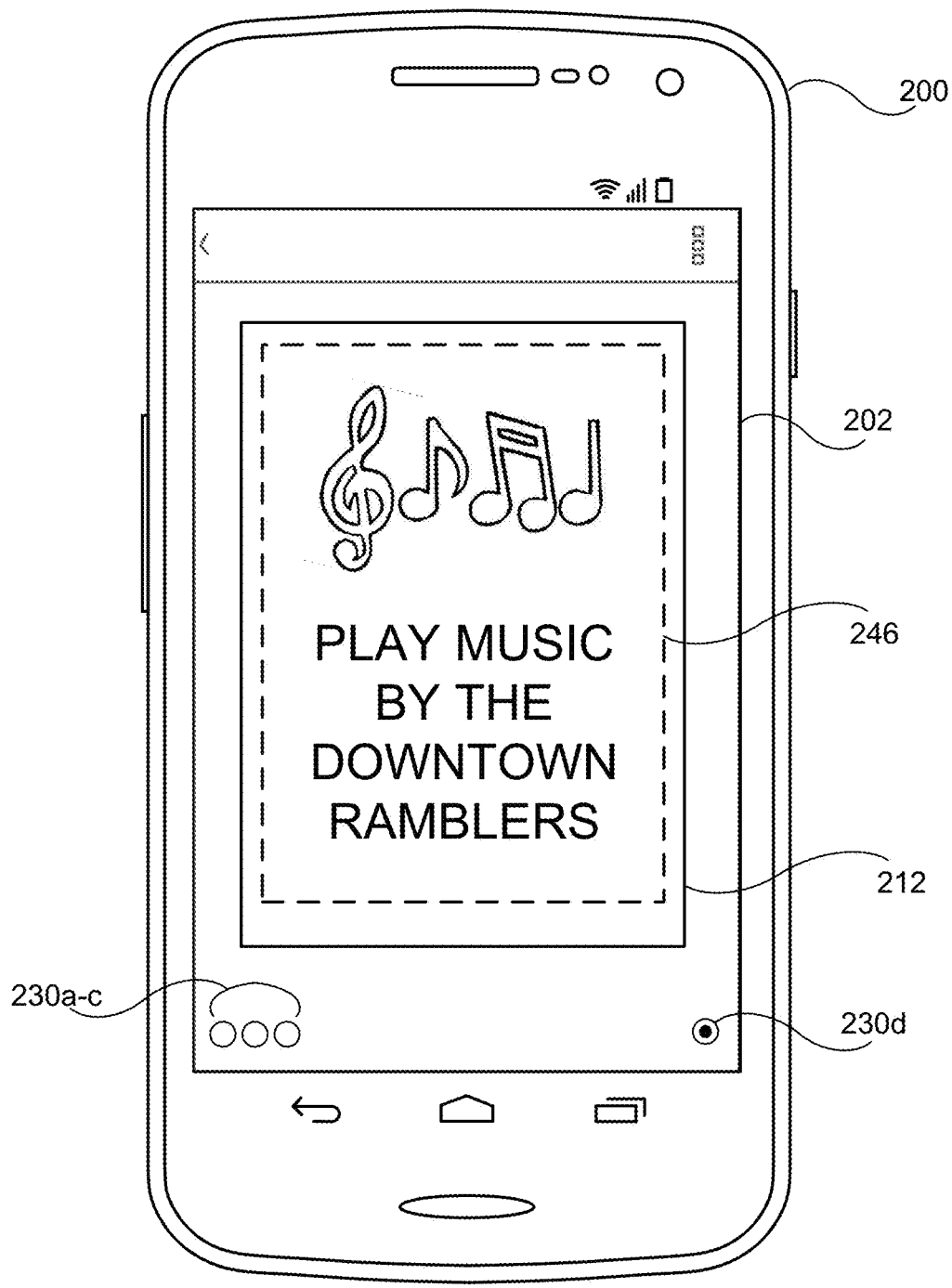
FIG. 2F illustrates a mobile computing device 200 displaying the fourth page 246 of the second content item 212 and an alternate pagination scheme comprising a plurality of content indicators after receiving indication of an input gesture from a user, according to an example implementation.

Further, in some implementations and according to the foregoing example, as shown in FIG. 2F, the mobile computing device 200 has output, for display, the fourth page 246 of the content item 212 upon receipt of the indication of the swipe gesture from the user. In example implementations, the mobile computing device 200 may be configured to output an animation such that the content indicator 230c associated with the third page 244 of the content item 212 "slides" across the bottom of the presence-sensitive display 202 in a manner evoking an abacus bead. As previously discussed, in one implementation and as shown in FIG. 2F, the mobile computing device 200 may be configured to output the content indicator 230c associated with the third page 244 of the content item 212 to appear in the bottom left corner of the presence-sensitive display 202 alongside content indicators 230a and 230b associated with the first page 240 and second page 242 of the content item 212, respectively. In one implementation, the mobile computing device 200 may be configured to output, for display, content indicator 230d as a first group of content indicators and content indicators 230a, 230b, and 230c as a second group of content indicators.

Figure 3:
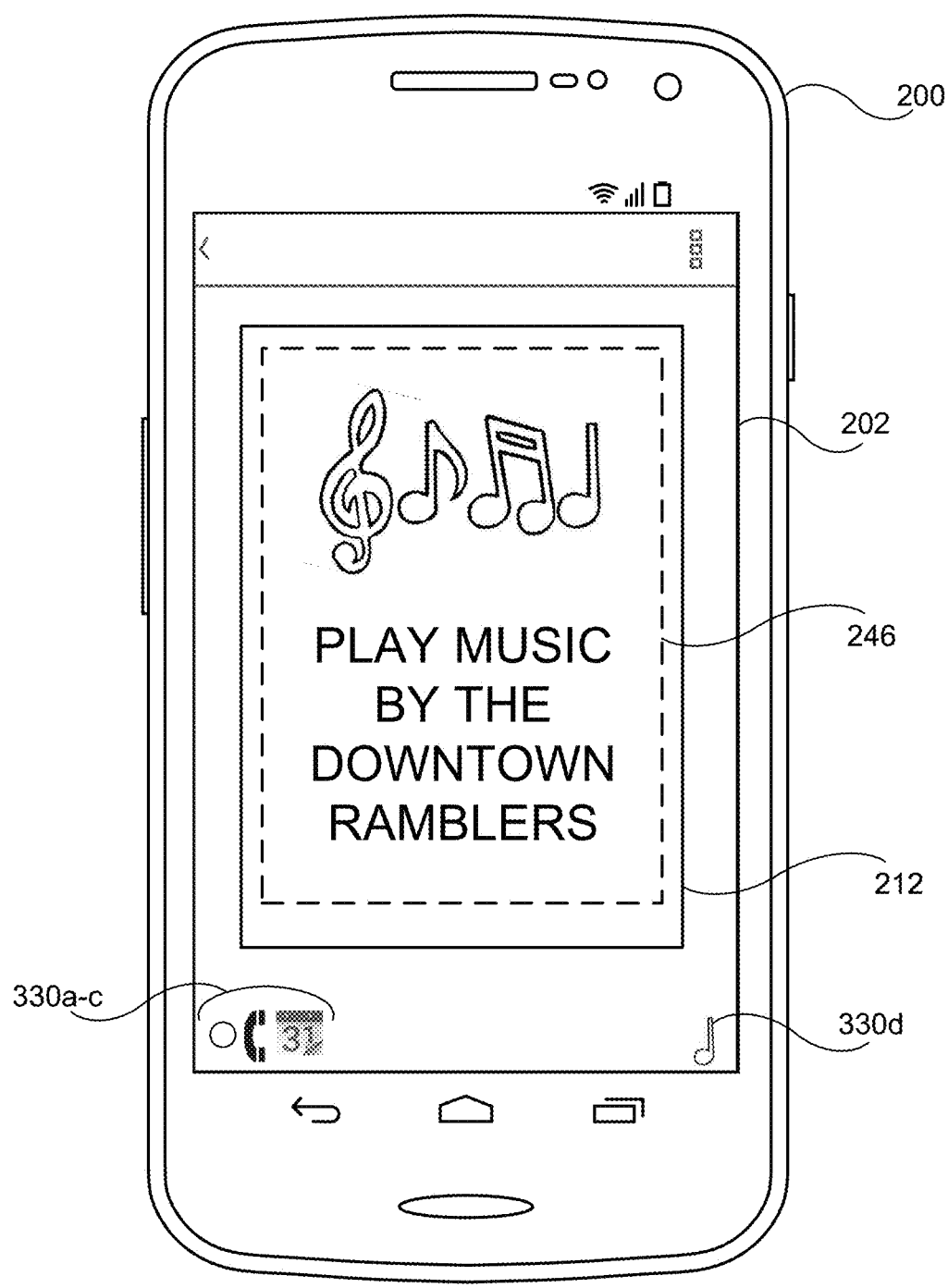
FIG. 3 illustrates a mobile computing device 200 displaying the fourth page 246 of the second content item 212 and an alternate pagination scheme comprising a plurality of content indicators represented by graphical icons after receiving indication of an input gesture from a user, according to an example implementation.

In example implementations, the content indicators associated with pages including actionable content may comprise graphical icons representing the actionable content. For example, as shown in FIG. 3, content indicators 230b-d have been replaced with content indicators 330b-d. In one implementation, and as shown in FIG. 3, a graphical icon of a musical note represents content indicator 330d and may correspond to the actionable content in the fourth page 246 of content item 212 (i.e., an option for the user to access a music library associated with the mobile computing device 200 to listen to music by The Downtown Ramblers). Likewise, in an example implementation, a graphical icon of a telephone may represent content indicator 330b and may correspond to the actionable content comprising the second page of content item 212 (i.e., a telephone number for the venue hosting the concert, as discussed in relation to FIG. 2D). As further shown in FIG. 3, a graphical icon of a calendar may represent content indicator 330b and may correspond to the actionable content comprising the third page of content item 212 (i.e., the date and time of the concert along with a question asking if the user would like to add the information to an associated calendar, as discussed in relation to FIG. 2E).

Figure 4:
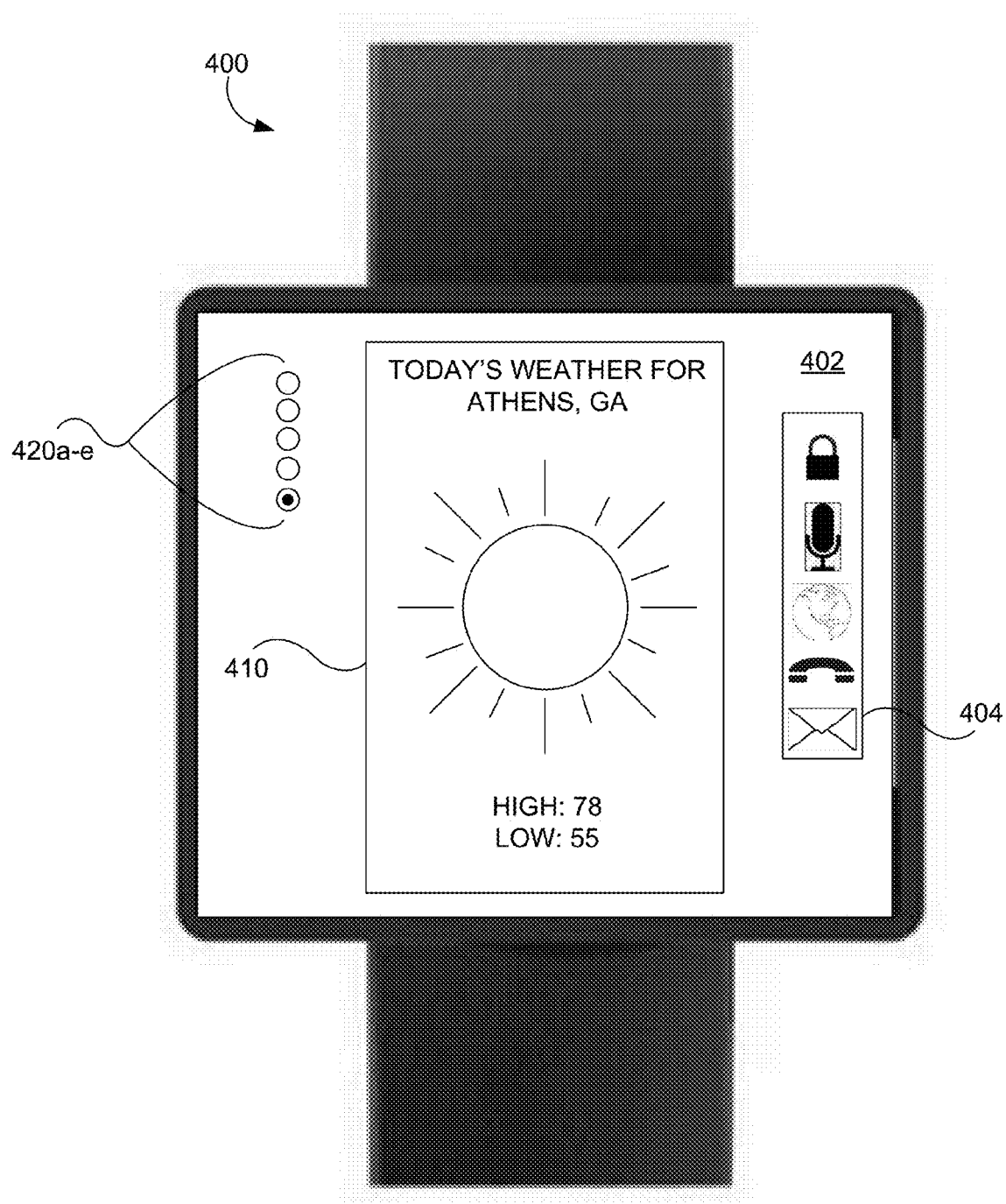
FIG. 4 illustrates a smart watch 400 displaying a first content item 410 and a pagination scheme comprising a plurality of content indicators, according to an example implementation.

FIG. 4 illustrates a smart watch 400 according to an example implementation of the disclosed technology, which may include some or all of the components of the computing device 100 shown in FIG. 1. As illustrated in FIG. 4, in one implementation, a smart watch 400 may comprise a display screen 402, which may be a presence-sensitive display. Similar to the mobile computing device discussed in relation to FIG. 2A, the presence-sensitive display 402 of the smart watch 400 may be configured to display visual content and to function as an input device at which users may input gestures, which may be input by an input object such as a stylus or finger, and which the smart watch 400 may be configured to receive as indications of input gestures. As discussed, an indication of an input gesture may be indicative of or associated with an input or an input gesture. Further, the indication of an input gesture may be associated with a user's selection of an input element (e.g., the input elements represented by graphical icons in the input element dock 404, as shown in FIG. 4A), which may be associated with an application that may be executed on the smart watch 400.

FIG. 4 further illustrates a content item 410, which the smart watch 400 may be configured to output, for display, on the presence-sensitive device 402. Similar to the example implementation discussed in relation to FIG. 2A, a content item 410 may include information that is relevant or useful to a user based on repeated actions performed by a user as determined by the smart watch 400 (or, e.g., an associated processor or remote processor such as a cloud processor). Therefore, for example, if a smart watch 400 identifies or determines that a user repeatedly utilizes the smart watch 400 to seek the weather forecast for Athens, Ga., the smart watch 400 may be configured to autonomously generate and output for display a content item 410 comprising Athens, Ga.'s daily weather forecast, as shown in FIG. 4. As previously discussed, a content item (e.g., content item 410) may comprise various forms of information that may be helpful to a user, such as an email or text message for the user as received by the smart watch 400. Further, a content item may comprise an article or other information from an internet website or other online information source.

As discussed in relation to FIG. 2A, in an example implementation, a computing device (e.g., smart watch 400) may be configured to generate and output, for display, a plurality of content items. Accordingly, in one implementation, a computing device may employ and be configured to output, for display, a pagination scheme to assist a user in navigating between multiple content items. FIG. 4 shows a pagination scheme comprising a plurality of content indicators 420a-e that correspond to respective content items. Further, in one implementation, the content indicator 420a that corresponds to the currently displayed content item (i.e., content item 410) may be appear different from the remaining content indicators by, for example, comprising two concentric circles with the interior circle being completely filled.

In some implementations, the smart watch 400 may be configured to output, for display, logically consecutive (i.e., adjacent) content items upon receipt of an indication of an input gesture. Accordingly, in one example, the smart watch 400 may enable a user to transition from content item 410 to an adjacent content item by receiving indications of input gestures (such as a swipe gesture moving from the top to the bottom of the presence-sensitive display 402). In one implementation, the smart watch 400 may be configured such that prior to outputting, for display, the new content item, it outputs an animation such that the original content item 410 "slides" down "through" the bottom of the presence-sensitive display 402. Subsequently, the smart watch 400 may be configured to output animation such that the new content item "slides" into the presence-sensitive display 402 "through" the top of the presence-sensitive display 402.

Likewise, in one implementation, the smart watch 400 may be configured to output an animation such that the content indicator 420a associated with the first content item 410 "slides" down the left side of the presence-sensitive display 402 and stops in the bottom left corner as the first content item 410 "slides" down "through" the bottom of the presence-sensitive display 402. As will be appreciated, in one implementation, as the user transitions through the plurality of content items and those content items are illustrated to depict sliding down through the bottom of the presence-sensitive display 402, the smart watch 400 may be configured such that content indicators corresponding to those content items are illustrated to depict sliding down the presence-sensitive display 402 in a manner similar to abacus beads.

As discussed, content indicators may correspond to or be associated with content items. In one implementation, content indicators may correspond to or be associated with a group of content items. For example, in one implementation, a computing device may be configured to output, for display, a pagination scheme comprising five content indicators. Likewise, however, the computing device may have autonomously generated and output, for display, a number of content items exceeding five. Accordingly, in an example implementation, one or more of the content indicators may correspond to or be associated with a plurality of content items instead of a single content item. In one implementation, content indicators associated with or corresponding to a plurality of content items may be differentiated from content indicators associated with or corresponding to a single content item. For example, content indicators associated with or corresponding to a plurality of content items may be larger in appearance, may appear as a different color or shape, or may appear as having a distinctive marking.

Figure 5:
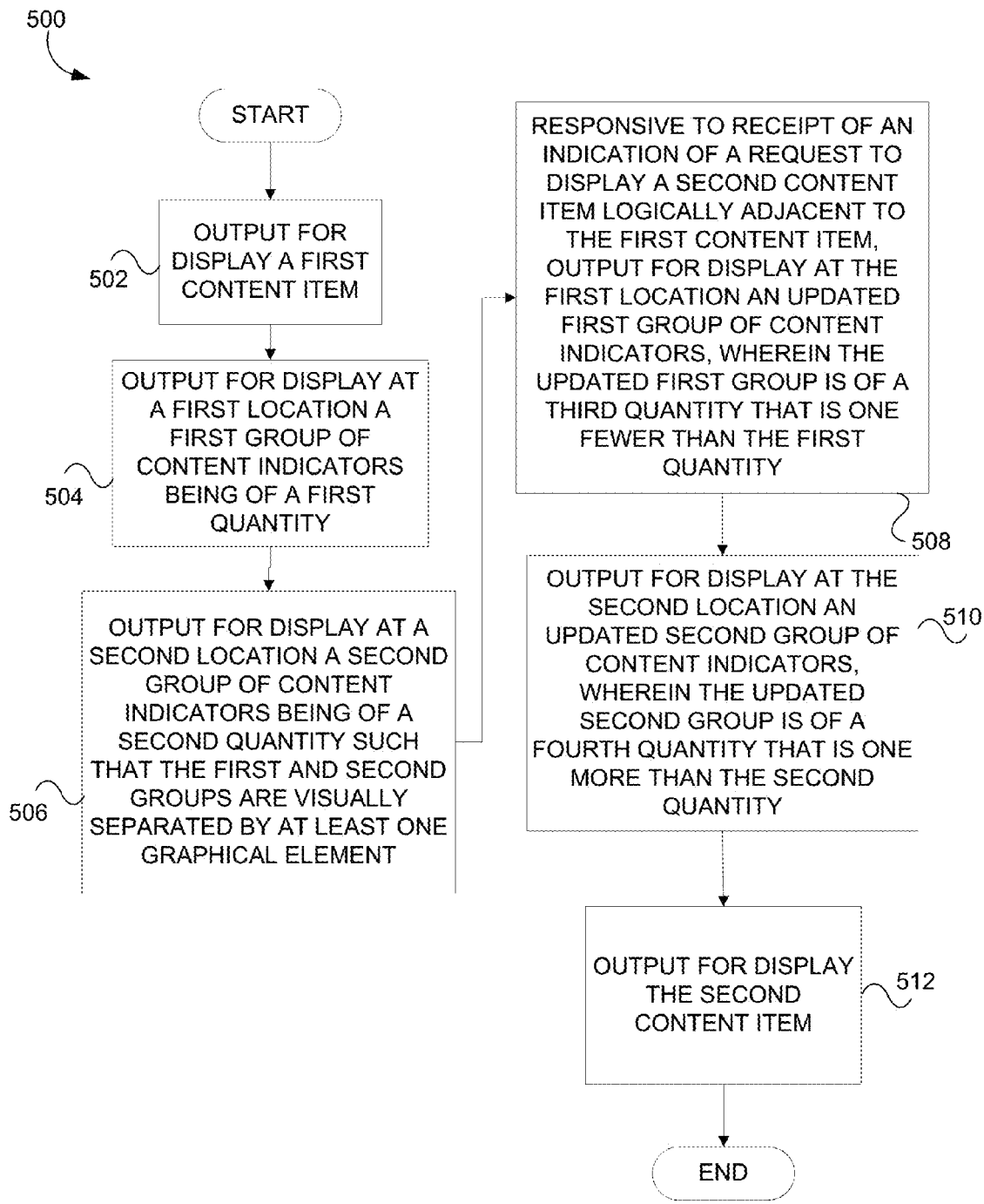
FIG. 5 is a flow diagram of a method 500 according to an example implementation.

FIG. 5 is a flow diagram of a method 500 according to an example implementation of the disclosed technology. The method 500 begins at block 502, where a computing device outputs, for display, a first content item. As previously discussed, a content item may include information that is relevant or useful to a user. In one implementation, a computing device may identify actions repeatedly performed by a user and, in response, autonomously generate and output, for display, one or more content items relating to the user's repeated actions. In one implementation, a content item may comprise multiple pages of information (i.e., the content item may span more than one page).

According to one implementation, at 504, the computing device outputs for display at a first location of a display area associated with the computing device a first group of content indicators, the first group of content indicators being of a first quantity. As discussed, in one implementation a pagination scheme may comprise a plurality of content indicators. In one implementation, the content indicators comprising the pagination scheme may be associated with a particular content item or may be configured to appear as though they correspond to a particular content item. At 506, the computing device outputs, for display, at a second location of the display area associated with the computing device, a second group of content indicators, the second group of content indicators being of a second quantity. Further, in one implementation, the first and second groups of content indicators are visually separated by at least one graphical element. In one implementation, the graphical element may be configured to appear similar to a string or wire that connects the groups of content indicators. In an alternate implementation, the graphical element may be configured to appear identical to the displayed background of the display area.

In one implementation, at 508, responsive to receipt of an indication of an input gesture to display a second content item logically adjacent to the first content item in the visual flow of content items, the computing device outputs, for display at the first location, an updated first group of content indicators, wherein the updated first group of content indicators is of a third quantity that is one fewer that the first quantity. Further, at 510, the computing device outputs, for display at the second location, an updated second group of content indicators, wherein the updated second group of content indicators is of a fourth quantity that is one more than the second quantity. Further, at 512, the computing device outputs, for display, the second content item. As will be appreciated, in one implementation, the operations described in blocks 508, 510, and 512 may combine to produce the abacus bead effect described in relation to FIGS. 2A and 2B as well as in relation to FIGS. 2C-F.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:
1. A method, comprising:
outputting, by a computing device, and for display at a display device, a first content item that is associated with a first content indicator that is a graphical icon representative of actionable content associated with the first content item;

outputting, by the computing device, and for display at a first location of the display device, a first group of content indicators, the first group of content indicators being of a first quantity;

outputting, by the computing device, and for display at a second location of the display device, a second group of content indicators, the second group of content indicators being of a second quantity, such that the first group of content indicators and the second group of content indicators are visually separated by at least one graphical element;

responsive to receiving an indication of a request to display a second content item logically adjacent to the first content item:

outputting, by the computing device, and for display at the first location of the display device, an updated first group of content indicators, wherein the updated first group of content indicators is of a third quantity that is one fewer than the first quantity;

outputting, by the computing device, and for display at the second location of the display device, an updated second group of content indicators, wherein the updated second group of content indicators is of a fourth quantity that is one more than the second quantity; and outputting, by the computing device, and for display at the display device, the second content item.

2. The method of claim 1, wherein a first content indicator is associated with the first content item.

3. The method of claim 1, further comprising:

responsive to receiving the indication of the request to display the second content item, outputting, by the computing device, and for display at a third location of the display device, a transition content indicator, wherein the third location of the display is located between the first location and the second location.

4. A method, comprising:

outputting, by a computing device, and for display at a display device, a first content item, wherein the first content item comprises a plurality of pages;

outputting, by the computing device, and for display at a first location of the display device, a first group of content indicators, first group of content indicators being of a first quantity;

outputting, by the computing device, and for display at a second location of the display device, a second group of content indicators, the second group of content indicators being of a second quantity, such that the first group of content indicators and the second group of content indicators are visually separated by at least one graphical element;

responsive to receiving an indication of a request to display a first page of the plurality of pages comprising the first content item:

causing, by the computing device, the first group of content indicators and the second group of content indicators to be removed from display on the computing device;

outputting, by the computing device, for display at the display device, the first page of the plurality of pages comprising the first content item;

outputting, by the computing device, for display at a third location of the of the display device, a third group of content indicators, the third group of content indicators being of a third quantity;

outputting, by the computing device, and for display at a fourth location of the display device, a fourth group of content indicators, the fourth group of content indicators being of a fourth quantity, such that the third group of content indicators and the fourth group of content indicators are visually separated by at least one graphical element;

responsive to receiving an indication of a request to display a second page of the plurality of pages comprising the first content item logically adjacent to the first page:

outputting, by the computing device, and for display at the third location of the display device, an updated third group of content indicators, wherein the updated third group of content indicators is of a fifth quantity that is one fewer than the third quantity;

outputting, by the computing device, and for display at the fourth location of the display device, an updated fourth group of content indicators, wherein the updated fourth group of content indicators is of a sixth quantity that is one more than the fourth quantity; and outputting, by the computing device, and for display at the display device, the second page of the plurality of pages comprising the first content item.

5. The method of claim 4, wherein a first content indicator is associated with the first page of the plurality of pages comprising the first content item.

6. The method of claim 5, wherein the first content indicator is a graphical icon representative of actionable content associated with the first page of the plurality of pages comprising the first content item.

7. The method of claim 6, wherein actionable content comprises content associated with functionalities or applications provided by the computing device.

8. The method of claim 4, wherein the third group of content indicators displayed at the third location is horizontally aligned with the fourth group of content indicators displayed at the fourth location.

9. The method of claim 8, further comprising:

responsive to receiving the indication of the request to display the second page of the plurality of pages comprising the first content item, outputting, by the computing device, and for display at a fifth location of the display device, a transition content indicator, wherein the fifth location of the display is located between the third location and the fourth location.

10. The method of claim 4, wherein the content indicators comprising the third and fourth groups of content indicators are associated with the plurality of pages comprising the first content item.

11. A non-transitory computer-readable medium storing instructions that, when executed by one or more processors, cause a computing device to:

output, for display at a display device, a first content item that is associated with a first content indicator that is a graphical icon representative of actionable content associated with the first content item;

output, for display at a first location of the display device, a first group of content indicators, the first group of content indicators being of a first quantity;

output, for display at a second location of the display device, a second group of content indicators, the second group of content indicators being of a second quantity, such that the first group of content indicators and the second group of content indicators are visually separated by at least one graphical element;

responsive to receiving an indication of a request to display a second content item logically adjacent to the first content item:
output, for display at the first location of the display device, an updated first group of content indicators, wherein the updated first group of content indicators is of a third quantity that is one fewer than the first quantity;
output, for display at the second location of the display device, an updated second group of content indicators, wherein the updated second group of content indicators is of a fourth quantity that is one more than the first quantity; and
output, for display at the display device, the second content item.

12. The computer-readable medium of claim 11, wherein a first content indicator is associated with the first content item.

13. The computer-readable medium of claim 11, wherein actionable content comprises content associated with functionalities or applications provided by the computing device.

14. The computer-readable medium of claim 11, wherein the first group of content indicators displayed at the first location is vertically aligned with the second group of content indicators displayed at the second location.

15. The computer-readable medium of claim 14, further storing instructions that, when executed by one or more processors, further cause the computing device to:
responsive to receiving the indication of the request to display the second content item, output, for display at a third location of the display device, a transition content indicator, wherein the third location of the display is located between the first location and the second location.

\* \* \* \* \*